United States Patent Office 3,065,212
Patented Nov. 20, 1962

3,065,212
POLYMERIZATION OF ACRYLONITRILE
George N. Milford and William K. Wilkinson, Waynesboro, Va., assignors to E. I. du Pont de Nemours and Company, Wilmington, Del., a corporation of Delaware
No Drawing. Filed Nov. 17, 1960, Ser. No. 69,839
5 Claims. (Cl. 260—85.5)

This invention relates to the polymerization of acrylonitrile and monomer mixtures of acrylonitrile and copolymerizable neutral ethylenically unsaturated monomers. More particularly, the invention relates to a process for polymerizing said monomers to provide polymers which are resistant to staining by acid and basic dyes.

Although acrylonitrile homopolymers have always been considered relatively undyeable and numerous modifications in dyeing procedure have been developed to obtain colored textiles thereof, this substantial lack of dye affinity does not mean that such polymeric products are completely insensitive to dyestuffs. Such polymer structures are lightly colored or stained when subjected to normal dyeing procedures. Textile fibers of acrylonitrile polymers which do not stain during dyeing have been sought as especially desirable for use in admixture with dyeable fibers of acrylonitrile polymers in the preparation of colored fabrics with white, uncolored portions, i.e., as a component in cross-dyed or multicolored fabrics entirely of acrylonitrile polymers. However, heretofore only the poorly dyeable or staining fiber of acrylonitrile polymers has been available for combining with more dyeable fibers of acrylonitrile polymers for cross-dyeing effects. Such fibers have failed to produce the desired high contrast in color.

It is, therefore, an object of this invention to provide a process for preparing acrylonitrile polymers and shaped structures therefrom which are resistant to staining by both basic and acid dyes. A more specific object of this invention is to provide a new and improved polymerization initiator system whereby acrylonitrile polymers can be produced that are, even in the form of fine fibers and thin film, resistant to staining with acid or basic dyes. Other objects will be apparent from the discussion that follows.

The objects of this invention are accomplished by a process which comprises polymerizing acrylonitrile alone or in admixture with not more than 4% of a neutral ethylenically unsaturated monomer in the presence of catalyzing amounts of a relatively mild peroxy catalyst selected from the group consisting of hydrogen peroxide, alkyl and aryl hydroperoxides, acetyl and triacetone peroxides, and alkali metal perborates and percarbonates, and an activator selected from the group consisting of 1-thioglycerol and 1-thiosorbitol. The amount of the peroxy catalyst may be varied from 0.05% to 10% by weight, based on the weight of the monomers, and the amount of the activator may be varied from 0.1% to 2% by weight, based on the weight of the monomers. In practicing this invention, the concentration of the monomers may vary from about 10% to about 40% by weight of the polymerization medium. Preferably, the monomer concentration is about 17% to 30%.

By the term "neutral ethylenically unsaturated monomer" it is meant those monomers which exhibit neither acid nor basic reaction.

In carrying out the process of this invention, it has been found that best results are obtained by a continuous process in which the ingredients are metered into a closed vessel equipped with an overflow outlet. Initially the vessel is partially filled with demineralized water and the monomers are added to the vessel. The water may contain trace amounts of iron in the form of an ionizable iron salt, e.g., ferric chloride, ferric bromide, ferric nitrate, ferric sulfate, etc. However, this is not required. Generally the water will contain from about 0.001% to about 0.05%, based on the weight of the monomers used, or up to about 5 parts per million based on the weight of the water. The vessel is well agitated and from the overflow an aqueous slurry of polymer is continuously obtained. The temperature of the vessel is maintained in the range from about 20° C. to 70° C. Initially the pH of the polymerizing medium is adjusted to from 2 to 5 and is maintained within this range throughout the polymerization. Polymers produced by this process have an intrinsic viscosity in the range from 0.8 to 3.0.

The following examples, in which parts and percentages are by weight unless otherwise indicated, illustrate specific embodiments of the invention and are not intended to limit the present invention except as specified in the appended claims.

EXAMPLE I

Continuous polymerization of acrylonitrile homopolymer was carried out as indicated by the tabulation of conditions and composition set forth below. Initially the polymerizing kettle was half filled with demineralized water containing iron and sulfuric acid to about the extent called for in the tabulated recipe, and, after heating to the temperature indicated, the polymerization reagents were added with sufficient demineralized water to maintain the recipe composition. Polymer samples were taken only after steady state conditions were attained.

*Continuous Polymerization*

| | |
|---|---|
| AN monomer feed (percent, B.O.T. [1]) | 17 |
| Residence time (minutes) | 60 |
| Temperature (° C.) | 50 |
| pH | 3.6 |
| $H_2O_2$ catalyst feed (percent, B.O.M. [2]) | 1.0 |
| Thioglycerol activator feed (percent, B.O.M.) | 0.3 |
| Iron ($Fe^{++}$, p.p.m., B.O.T.) | 1 |
| Conversion (percent) | 55 |
| Intrinsic viscosity | 1.5 |

[1] Based on total.
[2] Based on monomer.

The polymer obtained was spun into fibers by dry spinning a dimethylformamide solution of the polymer. The fibers produced were immersed in a dye bath which was raised to the boil and held at that temperature for at least thirty minutes. After treatment in the dye bath, the fibers were subjectively rated for staining on a scale from 1 to 5 (AATCC stain rating), with 5 indicating substantially no staining, 4 slight staining, 3 noticeable staining, 2 considerable staining, and 1 heavy staining.

The results obtained by using various dyes are set forth in Table 1 which follows:

TABLE 1

| Dye | Rating |
|---|---|
| Black dye (C.I. 27075) | 5 |
| Green cationic dye (Basic Green 3) | 5 |
| Red cationic dye (Basic Red 14) | 5 |
| Blue cationic dye (Basic Blue 22) | 5 |

EXAMPLE II

Continuous polymerization of acrylonitrile homopolymer was carried out as in Example I but with changes in catalyst, activator and iron concentrations as shown in the tabulation of conditions and compositions given below.

*Continuous Polymerization in Laboratory Reactor*

| | |
|---|---|
| AN monomer feed (percent, B.O.T.) | 17 |
| Residence time (minutes) | 60 |
| Temperature (° C.) | 50 |
| pH | 3.6 |
| $H_2O_2$ catalyst feed (percent, B.O.M.) | 0.03 |
| Thioglycerol activator feed (percent, B.O.M.) | 0.5 |
| Iron ($Fe^{++}$, p.p.m., B.O.T.) | 0.3 |
| Conversion (percent) | 55 |
| Intrinsic viscosity | 1.5 |

Fibers were prepared as described in Example I. The stain test ratings, using the dyes listed in Table 1, were all 5, indicating substantially no staining.

EXAMPLE III

Three homopolymers of acrylonitrile were prepared under polymerization conditions substantially as used in Example I except for changing the catalyst and/or activator as set forth below.

A. t-Butyl hydroperoxide catalyst (percent, B.O.M.) 2.0
B. Cumene hydroperoxide catalyst (percent, B.O.M.) 4.0
C. 1-thiosorbitol activator (percent, B.O.M.) 0.5

Fibers produced by dry spinning from dimethylformamide solutions of each of these polymers showed excellent dye resistance to both acid and basic dyes. No staining of these fibers was noted when they were subjected to dyeing at the boil in dye baths. In a comparative experiment, fibers were prepared from acrylonitrile copolymers modified with sodium styrene sulfonate and with 2-methyl-5-vinyl pyridine. These fibers were dyed to a full deep shade in the dye suited to the modified polymer fiber.

EXAMPLE IV

Two acrylonitrile polymers were prepared. One of the polymers, polymer A, having a composition of 93.6%
Iron ($Fe^{++}$, p.p.m., B.O.T.) 0.3
styrene sulfonate, was prepared by emulsion polymerization with a persulfate/bisulfite initiator system. The other polymer, polymer B, having a composition of about 97% acrylonitrile and 3% methyl acrylate, was prepared as described in Example I. Fibers A and B, prepared from the two polymers by dry spinning a dimethylformamide solution of the polymers, were treated in a common dye bath at the boil with the results as follows:

TABLE 2

| Fiber | Dye [1] | Rating |
|---|---|---|
| A | Orange cationic dye (See Example VIIIa USP 2,821,526). | Full deep shade. |
| B | Orange cationic dye (See Example VIIIa USP 2,821,526). | 5–4. |
| A | Red-brown cationic dye (See Example V, USP 2,099,525). | Full deep shade. |
| B | Red-brown cationic dye (See Example V, USP 2,099,525). | 5. |
| A | Blue cationic dye, bis(4-amino-m-tolyl) (o-chloro-phenyl)methane. | Full deep shade. |
| B | Blue cationic dye, bis(4-amino-m-tolyl) (o-chloro-phenyl)methane. | 5. |

[1] 2% based on the weight of Fiber A.

EXAMPLE V

An acid dyeable acrylonitrile polymer, polymer C, was prepared by aqueous polymerizing of acrylonitrile and N-vinylpyridine. The composition of the polymer was about 96.5% acrylonitrile and 3.5% 2-vinylpyridine. Fibers B and C, prepared from polymer C and polymer B of Example IV, were treated in a common dye bath with the results as follows:

TABLE 3

| Fiber | Dye [1] | Stain Rating |
|---|---|---|
| B | Violet (C.I. 45190) | 4. |
| C | Violet (C.I. 45190) | Full deep shade. |
| B | Brown (See Example I, USP 2,885,392) | 5–4. |
| C | Brown (See Example I, USP 2,885,392) | Full deep shade. |
| B | Orange (C.I. 22195) | 4–3. |
| C | Orange (C.I. 22195) | Full deep shade. |

[1] Bath contained 2% based on weight of Fiber C.

EXAMPLE VI

Fibers from polymers A, B, and C, of Examples IV and V, were treated in a dye bath containing both acid and basic dyes. The dyes used and stain ratings are shown in Table 4 which follows:

TABLE 4

| Fiber | Dye [1] | Stain Rating |
|---|---|---|
| A | (a) Blue (See Example IX, USP 2,701,802). (b) Blue (C.I. 62105). | Full deep shade. |
| B | (a) Blue (See Example IX, USP 2,701,802). (b) Blue (C.I. 62105). | 4–3. |
| C | (a) Blue (See Example IX, USP 2,701,802). (b) Blue (C.I. 62105). | Full deep shade. |
| A | (a) Green (C.I. 42000). (b) Red (C.I. 24810). | Full deep shade. (Green). |
| B | (a) Green (C.I. 42000). (b) Red (C.I. 24810). | 5–4. |
| C | (a) Green (C.I. 42000). (b) Red (C.I. 24810). | Full deep shade. (Red). |
| A | (a) Acetyl Fuchsine. (b) Red (Acid Red 182). | Full deep shade. (Fuchsia). |
| B | (a) Acetyl Fuchsine. (b) Red (Acid Red 182). | 5. |
| C | (a) Acetyl Fuchsine. (b) Red (Acid Red 182). | Full deep shade (Red). |

[1] (a) Basic dyes—bath contained 0.5% based on weight of Fiber A.
(b) Acid dyes—bath contained 0.5% based on weight of Fiber C.

As illustrated in the examples, the polymers prepared by the process of this invention show excellent resistance to staining by both acid and basic dyes.

In a series of experiments it was found that copolymers of acrylonitrile with as much as 4% of a neutral ethylenically unsaturated monomer when prepared with a peroxy catalyst and 1-thioglycerol or 1-thiosorbitol were resistant to staining by both acid and basic dyes. Any of the many known neutral ethylenically unsaturated monomers which are copolymerizable with acrylonitrile may be used, e.g., ethyl acrylate, methyl methacrylate, ethyl methacrylate, etc.; vinyl acetate, vinyl propionate, vinyl chloride, styrene, vinylidene chloride, acrylamide, methyl acrylamide, t-butyl acrylamide, methyl vinyl ketone, etc.

In addition to the peroxy catalysts specifically illustrated in the examples, other mild peroxy catalysts may be utilized, i.e., peroxides such as benzoyl peroxide, acetyl peroxide, lauryl peroxide, oleoyl peroxide, triacetone peroxide, and alkali metal perborates and percarbonates such as those of sodium and potassium.

In adjusting the pH of the polymerization medium, any number of well-known acids may be utilized, e.g., nitric, sulfuric and phosphoric acid, carboxylic acids such as acetic acid, sulfonic acids such as methane sulfonic acid, as well as other acids which are neither oxidizable nor reducible.

The principal advantage of the process of the present invention resides in the fact that acrylonitrile filaments, fibers and yarns, which are resistant to staining with both basic and acid dyes, are provided. With the provision of these novel shaped articles, fabricators and processors can now prepare fabrics of attractive styling which are composed entirely of acrylonitrile polymer yarns. As indicated previously, the fibers of the present invention may be combined with acid-dyeable, basic-dyeable, or both types of acrylonitrile fibers to provide cross-dyed or multicolored fabrics containing an undyed and unstained component.

As many widely different embodiments of this invention may be made without departing from the spirit and scope thereof, it is to be understood that this invention is not to be limited to the specific embodiments thereof except as defined in the appended claims.

We claim:

1. A process for preparing stain-resistant polymers by polymerizing a monomer composition containing from about 96% to 100% acrylonitrile and up to 4% of a copolymerizable neutral ethylenically unsaturated monomer, which comprises preparing an aqueous solution containing from about 10% to about 40% by weight of said monomers, adjusting the pH of said solution to the range from about 2 to 5, heating said solution to a temperature from about 20° C. to 70° C., and thereafter carrying out the polymerization in the presence of catalyzing amounts of a peroxy catalyst selected from the group consisting of hydrogen peroxide, alkyl and aryl hydroperoxides, acetyl and triacetone peroxides, and alkali metal perborates and percarbonates, and an activator selected from the group consisting of 1-thioglycerol and 1-thiosorbitol.

2. The process of claim 1 wherein said neutral monomer is methyl acrylate.

3. The process of claim 1 wherein said aqueous solution contains from about 17% to about 30% of said monomers.

4. The process of claim 1 wherein said catalyst is present in an amount from 0.05% to 10.0% and said activator is present in an amount from 0.1% to 2.0%, the percentage of said catalyst and said activator being based on the weight of said monomer in said solution.

5. A process for preparing stain-resistant polymers by polymerizing a monomer composition containing from about 96% to 100% acrylonitrile and up to 4% of a copolymerizable neutral ethylenically unsaturated monomer, which comprises preparing an aqueous solution containing from about 10% to about 40% by weight of said monomers, adjusting the pH of said solution to the range from about 2 to 5, heating said solution to a temperature from about 20° C. to 70° C., and thereafter carrying out the polymerization in the presence of catalyzing amount of hydrogen peroxide and an activator selected from the group consisting of 1-thioglycerol and 1-thiosorbitol.

References Cited in the file of this patent

UNITED STATES PATENTS

| | | |
|---|---|---|
| 2,456,360 | Arnold | Dec. 14, 1948 |
| 2,635,090 | Basdekis | Apr. 14, 1953 |
| 2,974,123 | Ketterer | Mar. 7, 1961 |